United States Patent
Heilig et al.

(10) Patent No.: US 7,035,722 B2
(45) Date of Patent: Apr. 25, 2006

(54) METHOD FOR OPERATING A STEERING SYSTEM FOR A MOTOR VEHICLE AND STEERING SYSTEM

(75) Inventors: Arnulf Heilig, Schwaebisch Gmuend (DE); Michael Boensch, Waldstetten (DE); Bernd Rommel, Waldstetten (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 10/985,418

(22) Filed: Nov. 10, 2004

(65) Prior Publication Data

US 2005/0096814 A1    May 5, 2005

Related U.S. Application Data

(63) Continuation of application No. PCT/EP03/04632, filed on May 2, 2003.

(30) Foreign Application Priority Data

May 16, 2002  (DE) ................................ 102 21 678

(51) Int. Cl.
 *B62D 5/04*  (2006.01)
(52) U.S. Cl. ...................... 701/41; 701/42; 180/443; 180/446
(58) Field of Classification Search ................ 701/41, 701/42, 44; 180/400, 417, 421, 441–446; 318/432, 433, 434
See application file for complete search history.

(56) References Cited

U.S. PATENT DOCUMENTS

| 5,236,056 | A |   | 8/1993  | Pfeffer et al. |
| 5,513,720 | A | * | 5/1996  | Yamamoto et al. .......... 180/421 |
| 5,612,877 | A | * | 3/1997  | Shimizu et al. ................ 701/41 |
| 5,698,956 | A | * | 12/1997 | Nishino et al. .............. 318/432 |
| 5,709,281 | A | * | 1/1998  | Sherwin et al. .............. 180/272 |
| 5,978,721 | A | * | 11/1999 | Kagawa et al. ................ 701/41 |

FOREIGN PATENT DOCUMENTS

| DE | 38 42 334 | 6/1990 |
| DE | 197 13 576 | 10/1998 |
| DE | 199 19 797 | 4/2000 |
| DE | 199 20 975 | 4/2000 |
| DE | 100 25 481 | 11/2001 |
| DE | 101 38 540 | 3/2002 |
| WO | 01/60682 | 8/2001 |

* cited by examiner

*Primary Examiner*—Richard M. Camby
(74) *Attorney, Agent, or Firm*—Jordan and Hamburg LLP

(57) ABSTRACT

In a method for operating a steering system for a motor vehicle, a set point torque predefined value is fed to a servomotor as a function of a manual steering torque generated by the driver, in order to generate a motor actuating torque which is to be transmitted to the steered vehicle wheels. A hysteresis torque is taken into account in the set point torque predefined value in order to compensate for the friction in the steering system.

5 Claims, 1 Drawing Sheet

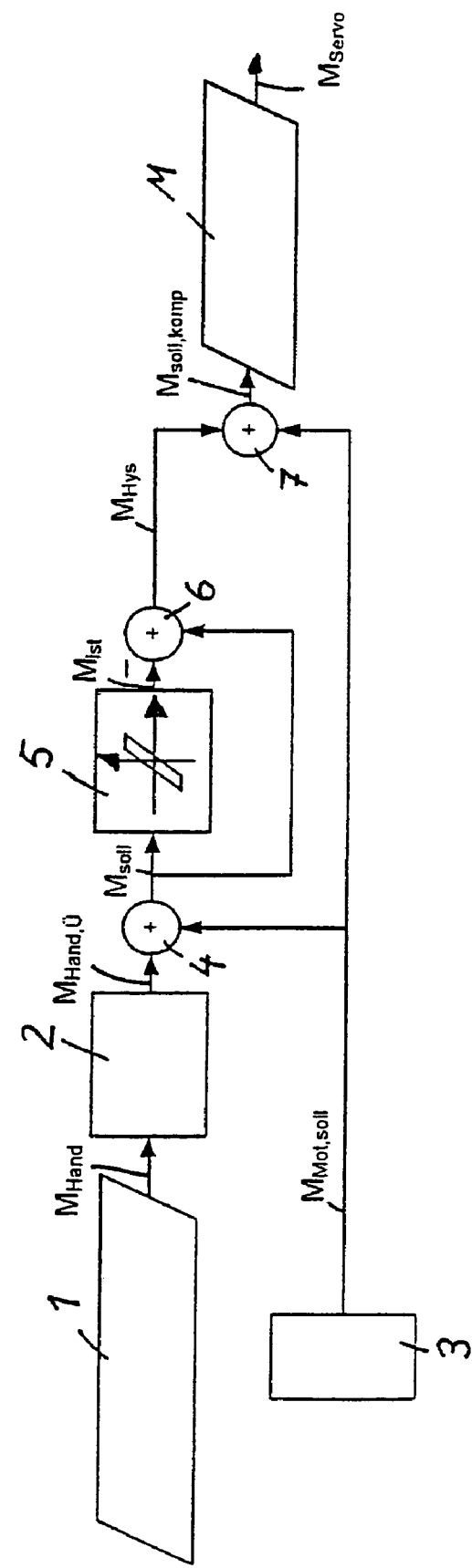

METHOD FOR OPERATING A STEERING SYSTEM FOR A MOTOR VEHICLE AND STEERING SYSTEM

BACKGROUND OF THE INVENTION

The invention relates to a method for operating a steering system for a motor vehicle and to a steering system.

The document DE 197 13 576 A1 discloses a steering system for a motor vehicle in which the steering movement of the driver is transmitted to a steering gear via the steering wheel and a steering shaft and the steering movement is converted by means of said steering gear into an actuating movement of the steered front wheels taking into account a transmission ratio. In order to support and boost the steering force which is generated by the driver, a servomotor is provided in which a motor actuating torque is generated as a function of the manual steering torque generated by the driver, and said motor actuating torque is transmitted to the steered vehicle wheels.

With such steering systems there is basically the problem that, in particular in order to trigger a steering movement, it is necessary for the driver to overcome an increased steering resistance which is due to system friction in the steering system. The system friction arises as a result of the interaction between moved mechanical parts in the steering system. The friction can basically be compensated by applying the motor actuating torque but, when a steering movement is initiated, there is the problem that the friction compensation does not become fully effective until the motor speed of the servomotor increases. Therefore, in the case of small steering movements the driver must apply an increased steering torque, which leads to a subjectively unpleasant steering sensation.

SUMMARY OF THE INVENTION

The invention provides a steering system and a method for operating a steering system in which the steering torque to be applied by the driver is reduced even in the case of small steering movements.

The intention is that this will apply in particular also to steering systems with a continuous mechanical connection between the steering wheel and steered wheels.

With the method according to the invention, the set point torque predefined value which is fed to the servomotor in order to generate the actual motor actuating torque takes into account a hysteresis torque which at least approximately compensates for the friction in the steering system and which is added on to the set point torque. This motor set point torque which compensates for the friction in the steering system is expediently acquired in a control unit connected upstream of the servomotor in the steering system, before the set point torque predefined value is transmitted to said servomotor. The system friction in the steering system can be at least approximately compensated, and in particular the steering torque to be applied by the driver can be reduced, particularly in the region of small steering movements, by the hysteresis torque being taken into account in the set point torque predefined value in a process occurring upstream. The reduced steering forces in the case of small steering movements also improve the subjective steering sensation for the driver.

The hysteresis torque is advantageously determined from a hysteresis characteristic curve as a function of the noncompensated set point torque in that, for example, the noncompensated set point torque is included in the hysteresis characteristic curve as an input variable and a theoretical actual torque, which is obtained from the noncompensated set point torque taking into account the hysteresis, is determined as an output variable. The hysteresis torque can then be acquired from the noncompensated set point torque by subtracting the theoretical actual torque. The hysteresis torque refers to the difference in torque between the ideal profile of the actual torque and the theoretical actual torque which is obtained by taking into account the hysteresis. This absolute differential value of the torques is added to the noncompensated set point torque in order to obtain the compensated motor set point torque.

The noncompensated set point torque is preferably acquired as a function of a noncompensated motor set point torque, which in turn has to be determined as a function of the manual steering torque, predefined by the driver, in order to boost the steering movement. In addition, the manual steering torque which is predefined by the driver can be taken into account additively in the noncompensated set point torque, but is expediently not taken into account until after a steering transmission ratio in a change speed gear mechanism of the steering system.

The steering system according to the invention which is advantageously suitable for carrying out the method comprises a change speed gear mechanism over the transmission path between the steering wheel and steered vehicle wheels as well as a servomotor for boosting the manual steering torque, and a control unit in which a hysteresis function which characterizes the friction in the steering system is stored and a hysteresis torque has to be determined and added to the set point torque predefined value, to be fed to a servomotor, in order to compensate for the friction.

Further advantages and expedient embodiments can be found in the further claims, the description of the figure and the drawing.

IN THE DRAWING

The drawing is a block circuit diagram relating to the acquisition of a motor set point torque for the servomotor of the steering system as a function of the friction which occurs in the steering system.

DESCRIPTION OF THE PREFERRED EMBODIMENTS

The individual blocks which are presented in the block circuit diagram symbolize the sequence of the method for operating the steering system. In a first block 1, a manual steering torque $M_{Hand}$ is firstly transmitted by the driver to the steering wheel of the vehicle, which, according to the following block 2, experiences a steering transmission ratio in a change speed gear mechanism of the steering system, and is reduced to a value $M_{Hand,\,\ddot{U}}$.

In a block 3, a noncompensated motor set point torque $M_{Mot,\,soll}$ is generated as a function of the manual steering torque $M_{Hand}$ generated by the driver, and has to be fed as a set point predefined value—together with the manual steering torque—to the servomotor M of the steering system in order to boost the steering force. The noncompensated motor set point torque $M_{Mot,\,soll}$ can be calculated, for example, as a non linear function depending on the manual steering torque $M_{Hand}$.

In an adder 4, the noncompensated motor set point torque $M_{Mot,\,soll}$ and the transmitted manual steering torque $M_{Hand,\,\ddot{U}}$ are combined and added to form a noncompensated set point torque $M_{soll}$. This noncompensated set point torque $M_{soll}$ is fed, as an input variable, to a hysteresis characteristic curve 5 by means of which it is possible to take into account the system friction in the steering system. A theoretical actual torque $M_{ist}$, in which the hysteresis is taken into account and which is available at the output of the hysteresis characteristic curve 5 for further processing, is acquired as a function of the noncompensated set point torque $M_{soll}$.

In an adder 6, the actual torque $M_{ist}$ which is provided with a negative sign is subtracted from the noncompensated set point torque $M_{soll}$, as a result of which the hysteresis torque $M_{Hys}$, which represents the difference, due to friction, between the actual torque $M_{ist}$ and an ideal characteristic curve, is generated.

In a following adder 7, the hysteresis torque $M_{Hys}$ is added to the noncompensated motor set point value $M_{Mot, soll}$, as a result of which a compensated set point torque $M_{soll, komp}$, which includes a compensation of the system friction, is obtained. This compensated set point torque $M_{soll, komp}$ is subsequently fed to the servomotor M as a set point torque predefined value, after which the servomotor M generates an actual motor actuating torque $M_{Servo}$ which is transmitted to the steered vehicle wheels in order to set the desired steering angle.

Reference symbols

1 Block
2 Block
3 Block
4 Adder
5 Hysteresis characteristic curve
6 Adder
7 Adder
M Servomotor
$M_{Hand}$ Manual steering torque
$M_{Hand, Ü}$ Manual steering torque transmitted
$M_{MOT, soll}$ Noncompensated motor set point torque
$M_{soll}$ Noncompensated set point torque
$M_{ist}$ Actual torque
$M_{HYS}$ Hysteresis torque
$M_{soll, komp}$ Compensated set point torque

The invention claimed is:

1. A method for operating a steering system for a motor vehicle, having at least one steerable vehicle wheel, having a change speed gear mechanism in the transmission path between a steering wheel and the vehicle wheel and having a servomotor (M), wherein a set point torque predefined value is fed to the servomotor (M) as a function of the manual steering torque ($M_{Hand}$) generated by the driver, in order to generate a motor actuating torque ($M_{Servo}$), wherein a hysteresis torque ($M_{Hys}$) which at least approximately compensates for the friction in the steering system is taken into account in the torque predefined value for the servomotor (M) in accordance with the function:

$$M_{soll, komp} = M_{soll} + M_{Hys}$$

where
$M_{soll, komp}$ is the compensated set point torque which is to be fed to the servomotor,
$M_{soll}$ is the noncompensated set point torque which is to be determined from the manual steering torque ($M_{Hand}$) and
$M_{Hys}$ is the hysteresis torque,
and wherein:
the hysteresis torque ($M_{Hys}$) is acquired from a hysteresis characteristic curve as a function of the noncompensated set point torque ($M_{soll}$).

2. The method as claimed in claim 1, wherein the noncompensated set point torque ($M_{soll}$) is included, as an input variable, in the hysteresis characteristic curve, and an actual torque ($M_{ist}$) is determined as an output variable, wherein the hysteresis torque ($M_{ist}$) from the noncompensated set point torque ($M_{soll}$) according to the relationship:

$$M_{Hys} = M_{soll} + M_{ist}.$$

3. The method as claimed in one of claim 1 or 2, wherein the noncompensated set point torque ($M_{soll}$) is acquired as a function of a noncompensated motor set point torque ($M_{Mot, soll}$) and of a manual steering torque ($M_{Hand, Ü}$), generated by the driver, according to the relationship:

$$M_{soll} = M_{Mot, soll} + M_{Hand, Ü}.$$

4. The method as claimed in claim 3, wherein the manual steering torque ($M_{Hand, Ü}$) is determined from the manual steering torque ($M_{Hand}$) which is transmitted to the steering wheel by the driver and modified in the change speed gear mechanism.

5. A steering system for a motor vehicle, in particular a steering system for carrying out the method as claimed in one of claim 1 or 2, having at least one steerable vehicle wheel, comprising a change speed gear mechanism in the transmission path between a steering wheel and the vehicle wheel, and a servomotor (M), wherein a set point torque predefined value can be fed to the servomotor (M) as a function of the manual steering torque generated by the driver, in order to generate a motor actuating torque ($M_{servo}$) which is to be transmitted to the vehicle wheel, in which the set point torque predefined value for the servomotor (M) in order a hysteresis torque ($M_{Hys}$) which at least approximately compensates for the friction in the steering system can be acquired according to a function, wherein, in a control unit, a hysteresis function which characterizes the friction in the steering system is stored, and wherein the at least approximately compensating hysteresis torque ($M_{Hys}$) can be acquired according to the function:

$$M_{soll, komp} = M_{soll} + M_{Hys}$$

where:
$M_{soll, komp}$ is the compensated set point torque which is to be fed to the servomotor,
$M_{soll}$ is the noncompensated set point torque, and
$M_{Hys}$ is the hysteresis torque,
and the hysteresis torque ($M_{Hys}$) can be acquired from a hysteresis characteristic curve as a function of the noncompensated set point torque ($M_{soll}$).

* * * * *